US009657858B2

(12) United States Patent
Ramspacher et al.

(10) Patent No.: US 9,657,858 B2
(45) Date of Patent: May 23, 2017

(54) NORMALLY-CLOSED ZERO-LEAK VALVE WITH MAGNETOSTRICTIVE ACTUATOR

(71) Applicant: The United States of America as represented by the Administrator of the National Aeronautics and Space Administration, Washington, DC (US)

(72) Inventors: Daniel J. Ramspacher, Washington, DC (US); James A. Richard, Grant, AL (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 30 days.

(21) Appl. No.: 14/868,041

(22) Filed: Sep. 28, 2015

(65) Prior Publication Data
US 2017/0089476 A1 Mar. 30, 2017

(51) Int. Cl.
*F16K 17/40* (2006.01)
*F16K 31/06* (2006.01)
(52) U.S. Cl.
CPC .......... *F16K 17/40* (2013.01); *F16K 31/0679* (2013.01); *Y10T 137/1744* (2015.04)
(58) Field of Classification Search
CPC ................. F16K 17/40; F16K 31/0679; Y10T 137/1632; Y10T 137/1647; Y10T 137/1744; Y10T 137/1692

USPC .............. 137/67, 68.11, 68.13, 68.27, 68.19; 251/68, 129.06, 129.15, 337, 335.3
See application file for complete search history.

(56) References Cited

U.S. PATENT DOCUMENTS

| | | | | |
|---|---|---|---|---|
| 3,759,282 | A * | 9/1973 | Kaldenback | F16K 17/40 251/335.3 |
| 5,251,871 | A * | 10/1993 | Suzuki | F16K 31/025 137/625.33 |
| 6,213,414 | B1 * | 4/2001 | Stier | F02M 51/0603 251/57 |
| 7,246,489 | B2 * | 7/2007 | Du Plessis | F16K 31/0613 251/129.06 |
| 7,309,032 | B2 * | 12/2007 | Fischer | F02M 51/0603 251/337 |
| 2008/0237516 | A1 * | 10/2008 | Hansson | B41F 7/30 251/129.01 |
| 2013/0146314 | A1 * | 6/2013 | Baxendell | F16K 31/003 251/279 |
| 2013/0340843 | A1 * | 12/2013 | Gilmer | F16K 17/406 137/68.11 |

\* cited by examiner

*Primary Examiner* — John Bastianelli

(57) ABSTRACT

A non-pyrotechnic, normally-closed, zero-leak valve is a replacement for the pyrovalve used for both in-space and launch vehicle applications. The valve utilizes a magnetostrictive alloy for actuation, rather than pyrotechnic charges. The alloy, such as Terfenol-D, experiences magnetostriction, i.e. a gross elongation, when exposed to a magnetic field. This elongation fractures a parent metal seal, allowing fluid flow through the valve. The required magnetic field is generated by redundant coils that are isolated from the working fluid.

20 Claims, 3 Drawing Sheets

NORMALLY-CLOSED ZERO-LEAK VALVE WITH MAGNETOSTRICTIVE ACTUATOR

ORIGIN OF INVENTION

This invention was made by employees of the United States Government and may be manufactured and used by or for the Government for governmental purposes without the payment of any royalties thereon or therefore.

FIELD OF THE INVENTION

The invention relates in general to fluid valves and in particular to zero-leak fluid valves suitable for use in spaceflight.

BACKGROUND

The pyrovalve is currently the only zero-leak valve qualified for spaceflight in the U.S. aerospace industry. The pyrovalve design can have reliability issues. Normally-Open (NO) and Normally-Closed (NC) pyrovalves use a primary charge and two redundant pyrotechnic initiators to permanently open and close the valve, respectively. The explosive reaction occurs in close proximity to propellant. Therefore, any internal leakage of the product gases into the wetted volume, known as blow by, could cause a decomposition of the propellant and catastrophic failure of the spacecraft. Thus, the reliability of the valve is crucial.

Pyrovalves are one-time-use. Therefore, individual units cannot be tested for functionality. There is very limited functional testing in situ on the vehicle. Power cannot be supplied to the valve while the initiators are installed. Verification of initiator installation is therefore impossible, creating a potential for loose, damaged, or cross-connected pins that could result in the failure of the pyrovalve and potential loss of the spacecraft. Designers of propulsion systems typically use multiple pyrovalves to mitigate these risks, which increases the mass and cost of the system. Once the initiators are installed, careful handling of the spacecraft must be taken to prevent premature actuation.

In addition, there are limited sources for purchasing pyrovalves.

A need exists for a valve that provides a zero-leak seal using a safer, more reliable actuator with a verifiable function.

SUMMARY

In one aspect, a zero-leak, normally-closed fluid valve with a central longitudinal axis includes an actuator housing and a flow cavity housing. The flow cavity housing has a flow inlet and a flow outlet. An actuator column includes an actuator rod disposed in the actuator housing. The actuator rod is centered on the central longitudinal axis and made of a magnetostrictive material. A solenoid surrounds the actuator rod and, when activated, creates magnetostriction in the actuator rod.

A Belleville spring stack having a mandrel guide is axially aligned with the actuator rod. A valve stem includes a portion that is axially translatable in an opening in one end of the mandrel guide. A fracture plate is axially aligned with and fixed to the valve stem. The fracture plate seals the flow outlet in a normally-closed position of the fluid valve. A compression spring has a first end that bears on a surface of the actuator housing and a second end that bears on the valve stem, to bias the valve stem towards the flow outlet. A bellows extends between the surface of the actuator housing and the valve stem and seals the actuator housing from the flow cavity housing.

The invention will be better understood, and further objects, features, and advantages thereof will become more apparent from the following description of the preferred embodiments, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION

Figure 1:
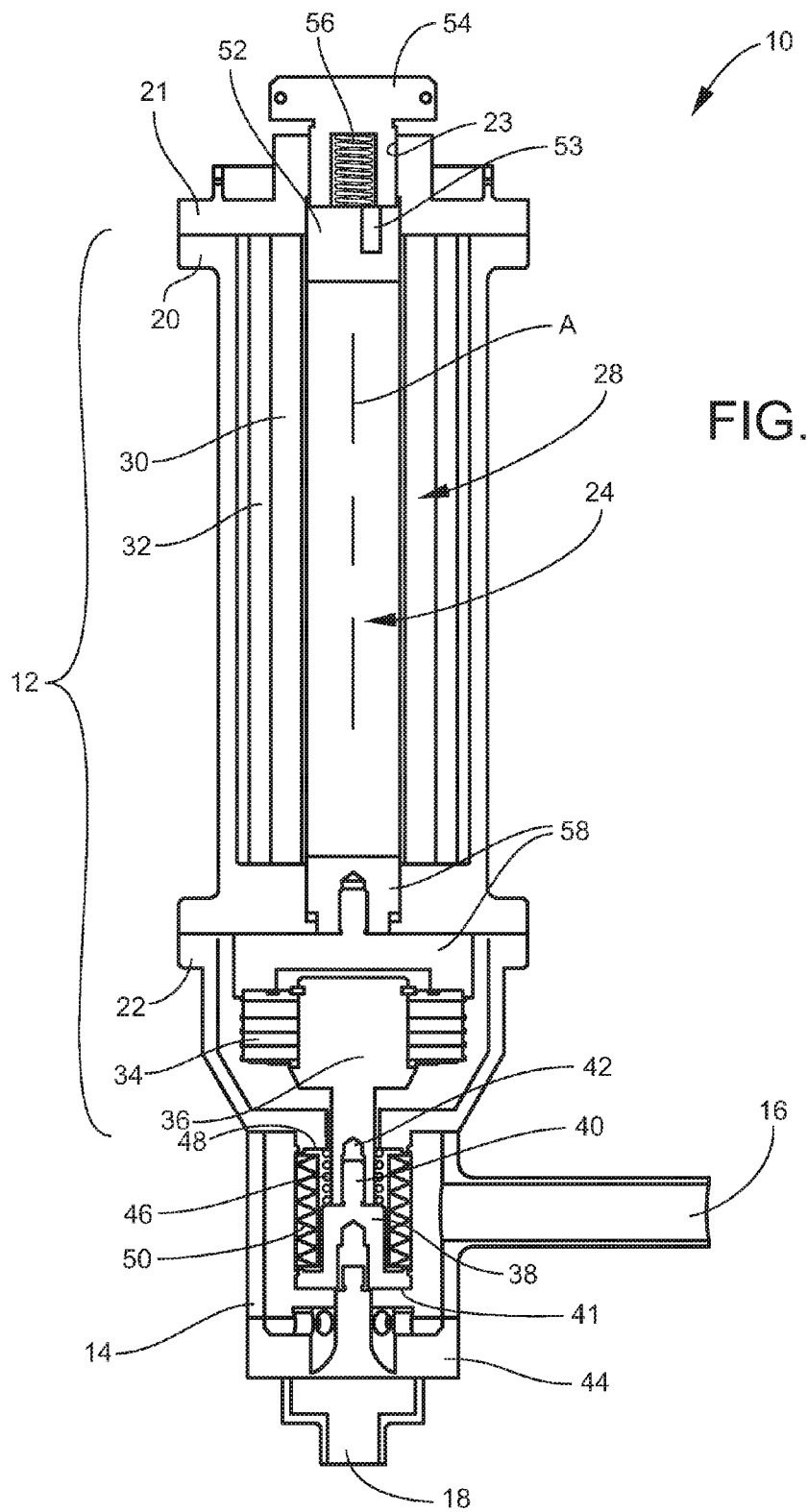
FIG. 1 is a longitudinal cutaway view of one embodiment of a zero-leak, normally-closed valve.

A non-pyrotechnic, normally-closed, zero-leak valve is an equivalent replacement for the pyrotechnic valve or pyrovalve, for both in-space and launch vehicle applications. The novel valve may use Selective Laser Melting (SLM) fabrication processes for component production. SLM processes may provide design flexibility and lower cost than the processes used to manufacture pyrovalves. The novel valve uses a magnetostrictive material for actuation, rather than pyrotechnic charges. An example of a suitable magnetostrictive material is Terfenol-D. When subjected to a magnetic field, the Terfenol-D elongates and fractures a parent-metal seal, thereby permanently opening the valve. Prior to actuation, the parent-metal seal, which is a body element within the wetted volume of the valve, provides a zero leak rate.

Magnetostrictive alloys expand when exposed to magnetic field. All ferromagnetic alloys experience some magnetostriction. Terfenol-D experiences "giant" magnetostriction, that is, elongation orders of magnitude larger than normal. This elongation can supply large loads. In one embodiment of the novel valve, the Terfenol-D is elongated to a strain of about 0.15% and can supply a significant force, with a maximum internal stress of about 40 MPa. Once removed from the magnetic field, the alloy returns to its original size. This phenomenon occurs extremely quickly, within 1 ms, and this value is repeatable. This response time, coupled with its large load capabilities, make Terfenol-D an ideal actuator material.

Direct Metal Laser Sintering (DMLS), a type of SLM manufacturing technique, may be used for the fabrication of nearly all metal parts of the valve. SLM technology "prints" the metal components layer by layer from a powder. Complex geometries may be printed in this manner. The complex geometries may be internal flow paths or nested internal moving parts. Such geometries are not possible with conventional fabrication methods. This technology enables the formation of internal flow orifices and a curved geometry near the valve seal. The flow paths provide minimal pressure losses after valve actuation and minimize the mass of the part. The curved features ensure the fracture occurs at the correct location. This technology allows the seal to be one-piece part, thereby simplifying the design.

Another feature of DMLS is that all metal parts of a single valve or even multiple valves can be printed simultaneously, which significantly decreases both production time and the unit cost. The DMLS piece parts may be built from a metal powder that is selectively sintered together via a high powered laser. The parts are built layer by layer using a Computer Aided Design (CAD) model of the part as a guide. The DMLS may have a tolerance limitation of 0.1 mm and may produce any number of parts within a 240 mm×240 mm×305 mm box, the dimensions of an exemplary powder bed. The powder bed size can grow depending on the machine available to the designer.

The DMLS capabilities may be considered when designing valve piece parts. For example, all key components needing tolerances less than 0.1" may be treated as a cast part and intentionally oversized via DMLS. The key components may then be precision machined to the required dimension using other available high resolution equipment. Every print lot may include standardized material samples that are subjected to mechanical testing. The resulting material properties are compared with accepted standards to verify part acceptability. All parts are flushed with isopropyl alcohol and particle counted to verify cleanliness.

A cut-away view of one embodiment of a novel zero-leak, normally-closed valve 10 in FIG. 1. Valve 10 has a central longitudinal axis A. Valve 10 includes two major subassemblies: the actuator and the flow cavity. An actuator housing 12 includes an actuator rod housing 20 and a spring stack housing 22. The actuator rod housing 20 may be closed by a cap 21. A flow cavity housing 14 includes a flow inlet 16 and a flow outlet 18. An actuator column 24 includes an actuator rod 26 disposed in the actuator housing 12 and centered on central longitudinal axis A. Actuator rod 26 is made of a magnetostrictive material. The magnetostrictive material may be, for example, Terfenol-D.

The actuator column 24 may include an upper load transmission plug 52 adjacent to the actuator rod 26. A preload bolt 54 passes through an opening 23 in the housing cap 21 and bears on the upper load transmission plug 52. A compression spring 56 is disposed in the preload bolt 54 with one end bearing on the upper load transmission plug 52 and another end bearing on an interior of the preload bolt 54. A strain gauge 53 may be mounted on the upper load transmission plug 52 to monitor the preload applied by the preload bolt 54. The actuator column 24 may include a lower load transmission plug 58 disposed between the actuator rod 26 and a Belleville spring stack 34. The lower load transmission plug 58 may be a two-piece part that transfers load from the elongating actuator rod 26 directly to the Belleville spring stack 34 without contacting other components.

A solenoid 28 surrounds the actuator rod 26. The activation of solenoid 28 causes magnetostriction in the actuator rod 26. Solenoid 28 includes a primary coil 30. Solenoid 28 may also include a redundant, secondary coil 32. The cap 21 and actuator rod housing 20 encapsulate the actuator rod 26 and solenoid 28. The cap 21, actuator rod housing 20, upper load transmission plug 52, actuator rod 26 and lower load transmission plug 58 complete the magnetic circuit around the solenoid 28. The cap 21, rod housing 20 and plugs 52, 58 may be made of steel, for example, 430 Corrosion Resistant Steel (CRES). The 430 CRES material has a nearly identical magnetic saturation to that of Terfenol-D.

The cap 21 and housing 20 acts as the load bearing body for valve actuation. The spring 56 ensures the internal actuator components remain in compression. The Belleville spring stack 34 is arranged on a mandrel guide 36 and is axially aligned with the actuator rod 26. A valve stem 38 includes an upper portion 40 that is axially translatable in an opening 42 in one end of the mandrel guide 36. A snap ring (not shown) may be used to secure the mandrel guide 36 to the valve stem 38 to prevent the spring stack 34 from separating from the valve stem 38 after the rod 26 is actuated. A fracture plate 44 is axially aligned with and fixed to the base portion 41 of valve stem 38. The fracture plate 44 seals the flow outlet 18 in the normally-closed position of the fluid valve 10, as shown in FIG. 1.

A compression 46 spring has a first end that bears on a surface 48 of the spring stack housing 22 and a second end that bears on the valve stem 38. The spring 46 biases the valve stem 38 towards the flow outlet 18. The spring 46 assists in opening valve 10 after the fracture plate 44 has been fractured. A bellows 50 extends between the surface 48 and the valve stem 38. Bellows 50 seals or isolates the interior spring stack housing 22 from the wetted volume of the flow cavity housing 14. Bellows 50 is dynamic seal that allows translation of the valve stem 38 during actuation. Bellows 50 may be made of, for example, a series of welded thin, stacked titanium disks.

Figure 2:
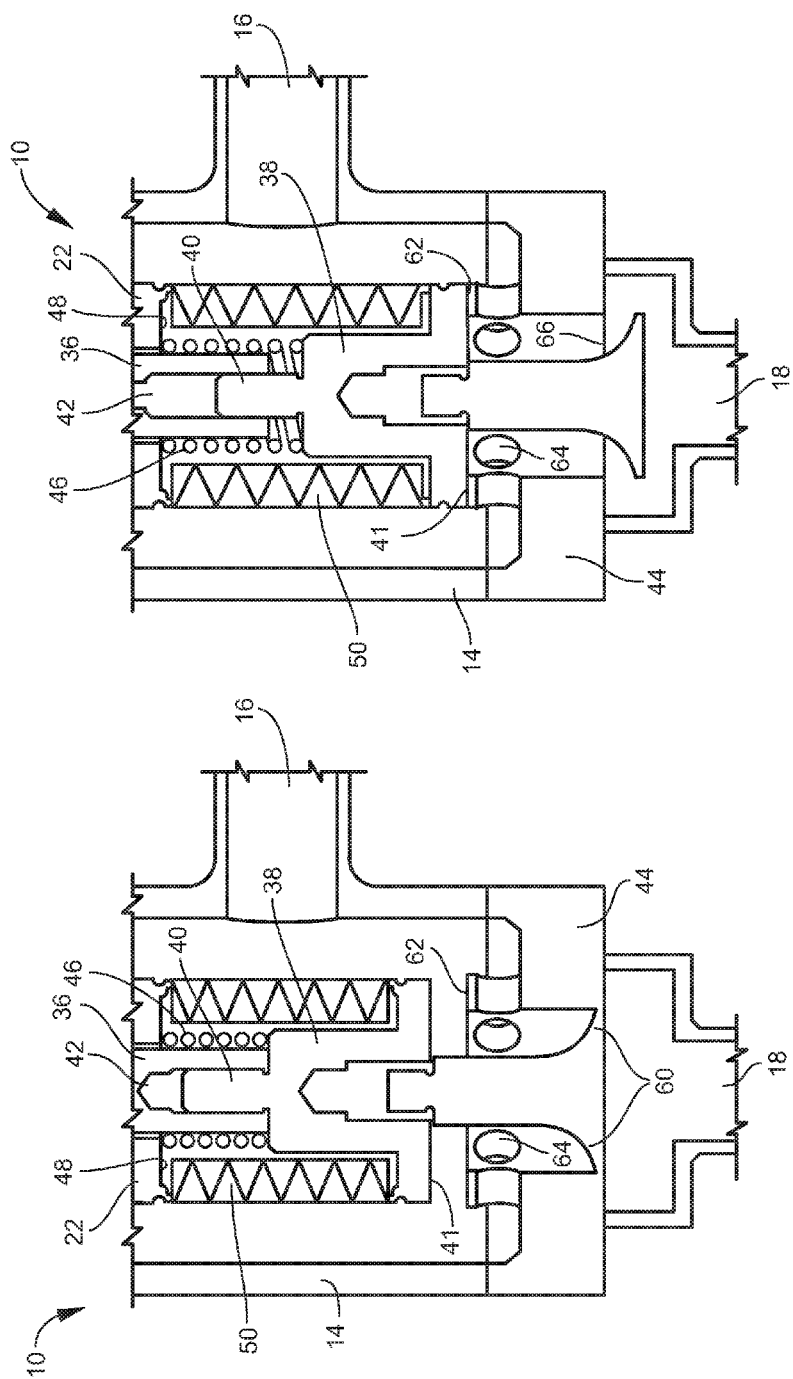
FIG. 2A is an enlarged view of a portion of the valve of FIG. 1, prior to actuation.
FIG. 2B is an enlarged view of a portion of the valve of FIG. 1, after actuation.
Figure 3:
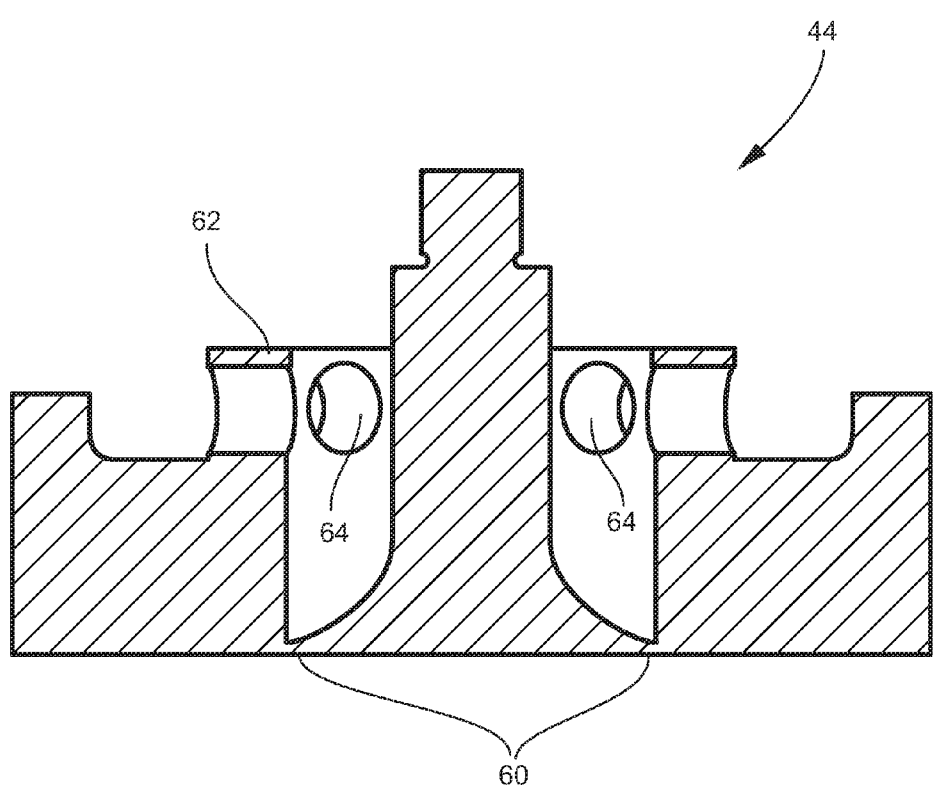
FIG. 3 is a sectional view of a fracture plate used in the valve of FIG. 1.

FIGS. 2A and 2B are enlarged views of the interior of the flow cavity housing 14 before and after actuation of valve 10, respectively. Fracture plate 44 (shown in enlarged cross-section in FIG. 3) contains the parent metal seal of the valve 10. The seal 60 is a relatively thin-walled annular section of the plate 44. Seal 60 may be the area of minimum cross-sectional area of plate 44. When fractured, seal 60 allows fluid to flow to outlet 18 with minimal pressure losses. The underside of seal 60 may include a groove (not shown) formed therein. The groove provides a stress concentration and may help to ensure a clean fracture with minimal particle generation. The bellows spring 46 assists in opening the valve 10 after fracture plate 44 has been fractured. All of the components in the flow cavity housing 14 may be made of, for example, titanium, such as 6AL4V Titanium. The titanium is compatible with all fluids of interest, for example, storable propellants, water, helium, nitrogen, argon, isopropyl alcohol, and argon. The external leak rate of the flow cavity housing 14 is less than $1\times10^{-6}$ scch (standard cubic centimeters per hour). Prior to actuation, the internal leak rate through seal 60 is also less than $1\times10^{-6}$ scch.

Prior to operation, the preload bolt 54 is threaded into a hole in cap 21. Torque is applied to the bolt 54 and the actuator column 24 is driven into the Belleville spring stack 34. This action places a preload on the actuator rod 26, valve stem 38 and fracture plate 44. The amount of preload may be monitored by strain gauge 53. The preload orients the crystal lattice within the actuator rod 26 to provide the maximum magnetostriction. The preload bolt 54 may then be lock-wired to the top of the valve 10 to prevent any rotation of the bolt 54 and subsequent changes to the preload. The Belleville spring stack 34 compensates for any thermal strains in the materials to maintain the necessary preload on the actuator rod 26.

Once the actuation is commanded, power is supplied to either one of the solenoid coils 30, 32, which causes magnetostriction in the actuator rod 26. The resulting elongation of rod 26 further deflects the Belleville spring stack 34 and increases the load on parent metal seal 60 within the fracture plate 44. The load increases until the seal 60 fractures. The spring 46 that is internal to the bellows 50 drives the valve stem 38 and the now-fractured center-section of the plate 44 downward to open the flow outlet 18. The downward motion of the actuator column 24 is arrested when the base 41 of the valve stem 38 contacts the boss 62 (FIG. 3) at the top of the fracture plate 44. The spring 46 is left in compression and keeps the valve stem 38 motionless and the valve 10 open. The working fluid inside the flow cavity housing 14 is now free to flow through the eight holes 64 formed around the boss 62 and then into the newly created orifice 66 (FIG. 2B) in the fracture plate 44 and out the flow outlet 18.

When the solenoid 28 is powered off, the actuator rod 26 returns to its original size. The spring 56 (FIG. 1), disposed within the preload bolt 54, restrains the actuator column 24 and prevents the actuator column 24 from rattling within the valve 10 after actuation.

While the invention has been described with reference to certain preferred embodiments, changes, alterations and modifications to the described embodiments are possible without departing from the spirit and scope of the invention as defined in the appended claims, and equivalents thereof.

What is claimed is:

1. A zero-leak, normally-closed fluid valve having a central longitudinal axis, comprising:
    an actuator housing and a flow cavity housing, the flow cavity housing having a flow inlet and a flow outlet;
    an actuator column including an actuator rod disposed in the actuator housing, the actuator rod centered on the central longitudinal axis and made of a magnetostrictive material;
    a solenoid that surrounds the actuator rod and, when activated, creates magnetostriction in the actuator rod;
    a Belleville spring stack including a mandrel guide that is axially aligned with the actuator rod;
    a valve stem having a portion axially translatable in an opening in one end of the mandrel guide;
    a fracture plate axially aligned with and fixed to the valve stem, the fracture plate sealing the flow outlet in a normally-closed position of the fluid valve;
    a compression spring with a first end that bears on a surface of the actuator housing and a second end that bears on the valve stem to bias the valve stem towards the flow outlet; and
    a bellows that extends between the surface of the actuator housing and the valve stem and that seals the actuator housing from the flow cavity housing.

2. The valve of claim 1, wherein the magnetostrictive material is Terfenol-D.

3. The valve of claim 1, wherein the solenoid includes primary coils and secondary coils that are redundant to the primary coils.

4. The valve of claim 1, wherein the actuator column includes an upper load transmission plug adjacent to the actuator rod and a preload bolt that bears on the upper load transmission plug.

5. The valve of claim 1, wherein the compression spring is disposed interior to the bellows.

6. The valve of claim 1, wherein the fracture plate includes an annular seal having a minimum cross-sectional area of the fracture plate.

7. The valve of claim 4, wherein the actuator column includes a second compression spring disposed in the preload bolt with one end bearing on the upper load transmission plug and another end bearing on an interior of the preload bolt.

8. The valve of claim 4, wherein the actuator column includes a lower load transmission plug disposed between the actuator rod and the Belleville spring stack.

9. The valve of claim 4, further comprising a strain gauge disposed on the upper load transmission plug.

10. The valve of claim 7, further comprising a cap for the actuator housing wherein the preload bolt passes through an opening in the cap.

11. The valve of claim 8, wherein the cap, actuator housing, upper load transmission plug and lower load transmission plug are made of steel.

12. The valve of claim 11, wherein the fracture plate is made of titanium.

13. The valve of claim 12, wherein an external leakage rate of the flow cavity housing, in the normally-closed position of the valve, is less than $1 \times 10^{-6}$ sech.

14. A zero-leak, normally-closed fluid valve having a central longitudinal axis, comprising:
    an actuator housing and a flow cavity housing, the flow cavity housing having a flow inlet and a flow outlet;
    an actuator column including an actuator rod disposed in the actuator housing, the actuator rod centered on the central longitudinal axis and made of Terfenol-D;
    a solenoid that surrounds the actuator rod and, when activated, creates magnetostriction in the actuator rod, the solenoid including primary coils and secondary coils that are redundant to the primary coils;
    a Belleville spring stack including a mandrel guide that is axially aligned with the actuator rod;
    a valve stem having a portion axially translatable in an opening in one end of the mandrel guide;
    a fracture plate axially aligned with and fixed to the valve stem, the fracture plate sealing the flow outlet in a normally-closed position of the fluid valve;
    a compression spring with a first end that bears on a surface of the actuator housing and a second end that bears on the valve stem to bias the valve stem towards the flow outlet; and
    a bellows that extends between the surface of the actuator housing and the valve stem and that seals the actuator housing from the flow cavity housing.

15. The valve of claim 14, wherein the actuator column includes an upper load transmission plug adjacent to the actuator rod and a preload bolt that bears on the upper load transmission plug.

16. The valve of claim 15, wherein the compression spring is disposed interior to the bellows.

17. The valve of claim 16, wherein the fracture plate includes an annular seal having a minimum cross-sectional area of the fracture plate.

18. The valve of claim 17, wherein the actuator column includes a second compression spring disposed in the preload bolt with one end bearing on the upper load transmission plug and another end bearing on an interior of the preload bolt.

19. The valve of claim 18, wherein the actuator column includes a lower load transmission plug disposed between the actuator rod and the Belleville spring stack.

20. The valve of claim 19, further comprising a cap for the actuator housing wherein the preload bolt passes through an opening in the cap.

* * * * *